United States Patent
Rosenberg

[11] 3,743,962
[45] July 3, 1973

[54] THIN FILM RING LASERS

[75] Inventor: Robert Rosenberg, Fair Haven, N.J.

[73] Assignee: Bell Telephone Laboratories, Incorporated, Berkeley Heights, N.J.

[22] Filed: June 1, 1971

[21] Appl. No.: 148,312

[52] U.S. Cl............ 331/94.5, 350/96 WG, 333/95, 331/56
[51] Int. Cl............................ H01s 3/05, G02b 5/14
[58] Field of Search............................ 331/94.5, 56; 350/96 WG; 333/6, 84, 95; 330/4.5

[56] References Cited
UNITED STATES PATENTS
3,558,213  1/1971  Marcatili.............................. 356/96
3,589,794  6/1971  Marcatili.............................. 356/96
3,538,453  11/1970  Miller................................ 331/94.5
3,614,198  10/1971  Martin et al....................... 331/94.5

OTHER PUBLICATIONS

Miller, Bell System Tech. Journal, Vol. 48, No. 7, September, 1969, pp. 2059-269.

Primary Examiner—Ronald L. Wibert
Assistant Examiner—R. J. Webster
Attorney—Arthur J. Torsiglieri and W. L. Keefauver

[57] ABSTRACT

There are disclosed lasers in which light-guiding thin films contain ring-like patterns for producing the positive feedback needed to sustain oscillation. The species include both optically pumped and electrically pumped lasers, as well as species employing the principle of Maxwell's fisheye. Other species employ spiral or helical structures or closely coupled rings.

2 Claims, 15 Drawing Figures

INVENTOR
R. ROSENBERG
BY
Wilford L. Wiener
ATTORNEY 3,743,962

THIN FILM RING LASERS

BACKGROUND OF THE INVENTION

This invention relates to apparatus for the stimulated emission of radiation and to such apparatus in which wave guiding occurs.

Lasers and laser amplifiers employing wave guiding have many advantages including compatibility with optical intergrated circuits, which are just beginning to be the subject of much research. The wave-guiding laser or amplifier presents new challenges not found in its bulkier predecessors in the laser art. For example, it is not a trivial problem to identify the various guiding structures that are feasible for use in lasers, laser amplifiers and closely related devices. More specifically, such devices should either have unusually high gain or efficient positive feedback to sustain oscillation in a miniature structure. Moreover, waveguide structures usually have a relatively low mass and heat-dissipating surface area compared to other lasers. It is not desirable to have waste heat generated in them from inefficient processes, since the resultant temperature rise could destroy them.

SUMMARY OF THE INVENTION

According to my invention, a wave-guiding device for the stimulated emission of coherent radiation contains ring-like patterns in thin films to provide positive feedback. Such feedback can readily sustain oscillations with very low losses other than the optical power coupled out of the laser for utilization.

Various species of my invention include both optically pumped and electrically pumped lasers, as well as species employing the principle of Maxwell's fisheye. Other species employ spiral or helical structures or closely coupled rings.

Advantageously, the active medium can be provided either in the guiding structures or in adjacent material. Moreover, it is advantageous that the ring-like patterns need not employ abrupt discontinuities in the index of refraction, but can even employ gradual variations in thin film thickness without any change in the bulk index of refraction. Such gradual variations in film thickness are readily produced.

A thin film ring laser within the generic scope of my invention is disclosed in the copending patent application of R. Ulrich and H. P. Weber, Ser. No. 131,296, filed Apr. 5, 1971, and assigned to the assignee hereof. A specifically distinguishing feature of their invention is their use of a uniform wave-guiding thin film wrapped about a transparent cylinder or other body of lower-index material.

BRIEF DESCRIPTION OF THE DRAWING

Further features and advantages of my invention will become apparent from the following detailed description, taken together with the drawing, in which.

DESCRIPTION OF ILLUSTRATIVE EMBODIMENTS

Figure 1A:
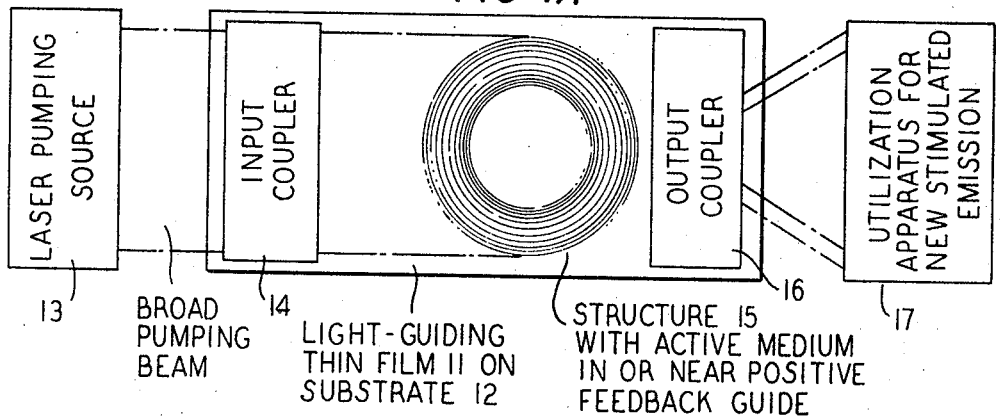
FIGS. 1A and 1B are partially pictorial plan and elevation views, respectively, and partially block diagrammatic illustrations of a first embodiment of my invention.
Figure 1B:
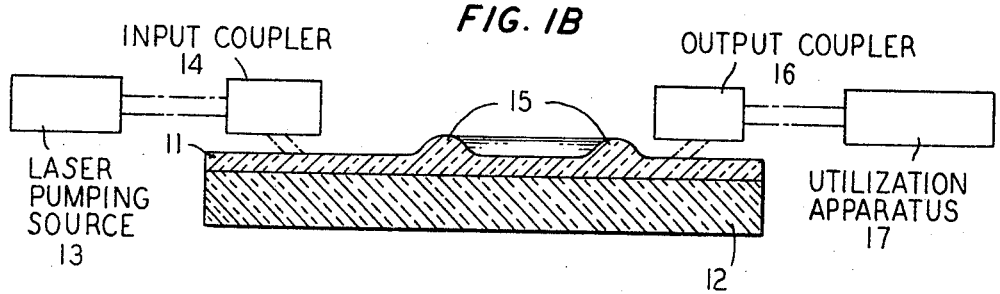

A basic embodiment of my invention is shown in FIGS. 1A and 1B. It is shown in a simplified form for purposes of illustration. The embodiment of FIGS. 1A and 1B includes the light-guiding thin film 11 deposited on a substrate 12 which can be seen in FIG. 1B. The light-guiding thin film 11 includes as a contiguous portion thereof a laser-guiding structure 15 which includes a thickened portion of film 11 and an active medium in or near that portion of film 11. The guiding structure 15 provides ring-like positive feedback. Pumping light to pump the active medium is coupled into thin film 11 by the input coupler 14 from a pumping laser source 13; and the output stimulated radiation from the laser structure 15 is coupled out by an output coupler 16 toward a utilization apparatus 17.

For purposes of illustration in the embodiment of FIGS. 1A and 1B, it is assumed that the active medium is included directly in the ring-like portion of thin film 11 within the laser-guiding structure 15. The increased phase propagation constant $\beta$ needed for guiding is achieved in the structure 15 by an increase in the thickness of thin film 11 in this region without any changes in the compositions of thin film 11 or substrate 12 in these regions. Nevertheless, changes in these compositions to increase optical density could also facilitate guiding. The change in thickness is the most easily illustrated way to achieve the guiding necessary to my invention.

The input coupler 14 and the output coupler 16 could be any of several types of couplers now known in the optical arts for coupling through a broad surface of a thin film. Illustrative of those techniques and devices are those disclosed in the copending patent application of P. K. Tien, Ser. No. 793,696, filed Jan. 24, 1969, and assigned to the assignee hereof. The output coupler 16 couples the stimulated radiation from the thin film 11 and, specifically, frustrates the guiding in structure 15 at the point selected for output coupling. These two aspects of coupling can be separate. That is, coupling from structure 15 into surrounding film 11 would be followed by coupling from film 11. Or the utilization apparatus 17 could be integrated into the surrounding thin film. If used, output coupler 16 is illustratively disposed very close, within about one wavelength, of the guiding structure 15. Such frustration of the guiding will typically produce two output beams, as shown in FIG. 1A, one for each direction of traveling wave oscillation of the laser radiation within the laser structure 15.

It will also be noted that the pump light from source 13 is focused into a broad beam capable of pumping the entirety of the active medium associated with structure 15. Preferably, most of the pump light would be absorbed in the active medium before it reaches output coupler 16. Nevertheless, means can be provided in association with utilization apparatus 17 for filtering out residual pump light. Typically, only the stimulated coherent radiation occurring at a frequency shifted from the pump frequency is desired for use in the apparatus 17. Apparatus 17 could be a modulator for an optical communication system.

Additional usefulness can be achieved for the laser structure 15 in FIGS. 1A and 1B if it is made an integral part of an optical or opto-electronic circuit, all of which can be included in thin film 11. In fact, even the pumping laser might be an injection laser diode included in thin film 11. In such an integrated structure, there is no need for the external couplers 14 and 16, although internal coupling would still be provided; and there is no problem of stability in the mechanical relationship of source 13 and utilization apparatus 17 to the thin film 11 and associated devices.

In the optical pump embodiment of FIGS. 1A and 1B, it should be apparent that the pump wave is also a guided wave. The pump intensity is maintained high by virtue of the pump wave confinement in the thin film 11.

It should be further noted with respect to the structure of the embodiment of FIGS. 1A and 1B that the overall diameter of the ring laser structure 15 can be very small, so that high packing densities of such sources are possible. Diameters of the order of 0.010 inch seem quite practical. Such small sources may also be very desirable for combination with other optical and electrical circuit structures, especialy for miniaturization of the complete apparatus.

In the description of operation which follows, I confine my attention to laser-guiding structures 15 which are contiguous with a guiding layer such as layer 11 through which input or output coupling to the ring is achieved. It would also be possible to make laser-guiding structures which are isolated from other guiding structures such as the surrounding thin film 11, except for evanescent field input and output coupling; but I believe an important aspect of my invention to reside in the compatibility of my laser-guiding structures with integrated optics in thin film guides.

In the operation of the embodiments of FIGS. 1A and 1B, the laser-guiding structure 15 provides a variation of the effective index of refraction (more correctly, the phase propagation constant $\beta$ in analogous units) which permits closed optical paths. A sample of the feasible possible radial variations of effective refractive index or phase propagation constant is shown in FIGS. 2A through 2D. The radial variation of phase propagation constant employed in FIGS. 1A and 1B most closely approximates that of curve 24 in FIG. 2D. It will be noted that all these variations of effective index or phase propagation constant are circularly symmetrical. Other structures which are topologically similar to circularly symmetrical structures are possible and would be equivalent from a theoretical viewpoint. Nevertheless, such other structures will not be considered further in this description.

Figure 2A:
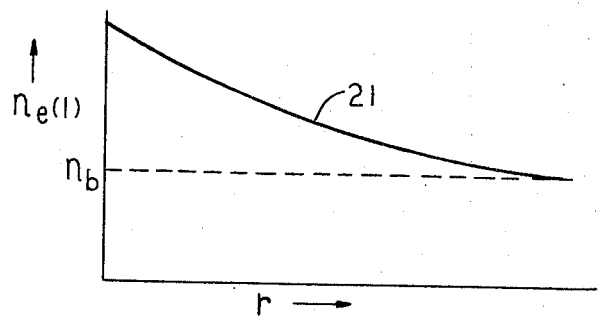
FIGS. 2A through 2D show curves useful in explaining the invention.
Figure 2B:
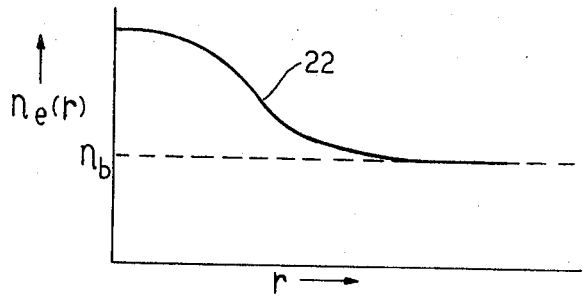
Figure 2C:
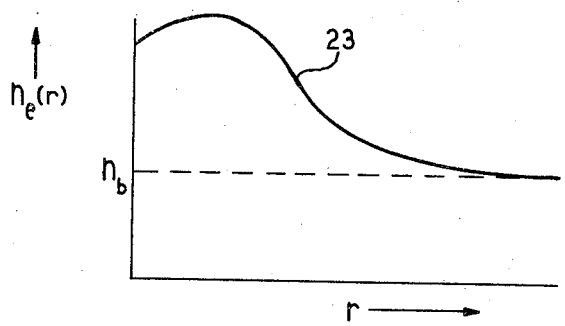

Specifically, the illustrative index profiles may be described as follows. Curve 21 of FIG. 2A shows a profile which decreases monotonically with increasing radius with continuously decreasing slope. Surprisingly enough, my analysis shows that such a structure would be an effective guiding structure for ring-like positive feedback. Curve 22 shows an effective index profile which decreases monotonically with increasing radius, but exhibits an inflection from increasing magnitude of slope to decreasing magnitude of slope as radius increases. The effective index profile 23 of FIG. 2C shows an effective index first increasing as radius increases and then decreasing as radius increases, with an inflection point in the slope as described for curve 22 of FIG. 2B. The index profile shown by curve 24 of FIG. 2D coincides with the surrounding index value throughout a central portion, then increases rapidly to a substantial constant maximum value and then decreases rapidly to the surrounding index value as radius increases. These variations could also be made more gradually, as illustratively shown in the embodiment of FIGS. 1A and 1B.

The index profiles of FIGS. 2A through 2D are merely illustrative of many and varied possibilities for ring-like guiding for laser action according to my invention.

The criteria for stable guiding which emerge from ray optics are as follows:

1. A given ray should have an inner and an outer turning radius. I designate these radii, respectively, $r_i$ and $r_o$. The product of radius and effective refractive index must have the same value, for example $k$, at the turning radii;

$$r_i n_e \mid^{r=r_i} = r_o n_e \mid^{r=r_o} = k .$$

(1)

When this condition is satisfied, the ray may be trapped.

2. The product $rn\mid^r$ should exceed $k$ between $r_i$ and $r_o$. This condition insures that the light is trapped between $r_i$ and $r_o$.

3. The rate of change of effective index with radius must obey the following inequalities at the turning radii:

$$(r)/(n_e)(dn_e)/(dr) > -1 \text{ at } r = r_i.$$

(2)

$$(r/n_e)(dn_e/dr) < -1 \text{ at } r = r_o .$$

(3)

Whereas the previous condition was appropriate for the trapping of the light in a desired annular region, the latter conditions are sufficient conditions to insure that the ray will turn outward at radius $r_i$ and inward at $r_o$.

Conditions (1)–(3) are all based on ray optics, which implies that the index variations are negligible on the scale of optical wavelengths. The limit of abrupt index changes also provides trapping however, as is well known from all the work on dielectric guides. The ring guides treated by Marcatili are special cases of the more general index profiles treated here.

Note that the index behavior outside the turning radii is irrelevant, to a first approximation, so that only a limited annular region need satisfy the above criteria. The criteria are expected to have a close correspondence with the results of a wave analysis so long as ray analysis is valid. A wave treatment would supply further information, such as the wavelengths which are compatible with resonant modes.

The condition (2) can actually be relaxed. The curve in the profile $rn_e(r)$ can have wiggles between $r_i$ and $r_o$ and the wiggles may even drop below $k$ provided they are narrow enough in width to allow coupling betwen waves on either side of the dip.

It will be noted that in the description of FIG. 1 no specific laser active medium and no specific pumping laser source 13 are mentioned. It should be apparent that a large number of choices can be made with respect to these specific details. For example, the laser active medium could be a dye such as rhodamine 6–G and the pumping laser source 13 would then be a gaseous ion laser of sufficiently high frequency, for example, the 3,371 angstrom-unit pulsed nitrogen laser. Pumping power requirements from source 13 are reduced because of the confinement of the pumping wave in thin film 11. It should be noted that inorganic ions such as neodymium ions may alternatively be desirable for use as the active medium in structure 15. Such a laser can also be optically pumped at a frequency higher than the intended laser frequency.

The principles of my invention also extend to essentially planar ring lasers which are pumped as injection lasers. Such a laser structure is illustrated in FIG. 3.

Figure 3:
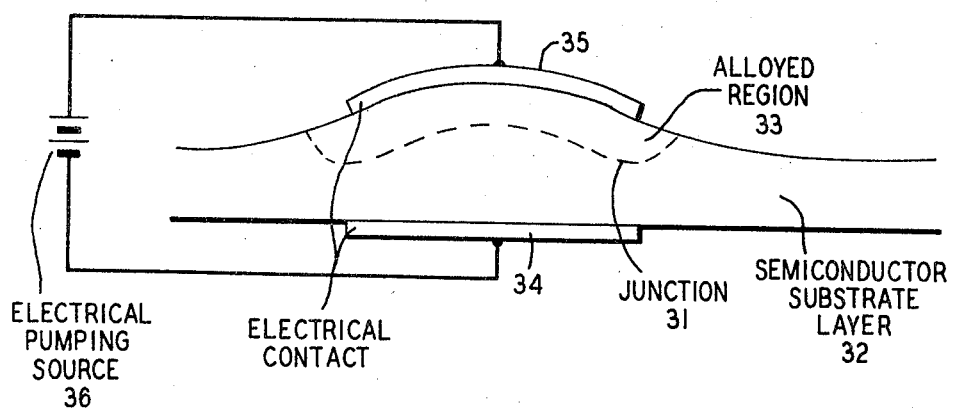
FIG. 3 is a partially pictorial and partially schematic illustration of an injection laser according to my invention.

In FIG. 3 the junction 31 is formed in the n-type semiconductor substrate layer 32 by an alloyed p-type region 33. The junction laser is pumped by injection by the electrodes 34 and 35 applied to regions 32 and 33, respectively, and connected to opposite terminals of a pumping source 36.

Illustratively, the substrate layer 32 is sufficiently thin to guide light and prevent it from spreading in that thin dimension. For that illustrative case, ring-type guiding can be achieved in the junction 31 by a thickness profile of the substrate layer 32 of the type illustrated in FIG. 2B. The laser oscillation will then follow an annular path about the region of greatest thickness. Since gain is provided for the laser radiation at every point throughout the circular path, the positive feedback necessary for oscillation is present.

Moreover, it should be apparent from the embodiment of FIG. 3 that more than one thin layer may be part of the guiding structure according to my invention. In fact, multiple thin-film layers can be used in all the embodiments of my invention. Furthermore, it should be apparent that the guiding region for light outside of the ring laser structure can be symmetrically bounded at its two major surfaces by dielectric materials of like index, as in FIG. 3; or it can be bounded by dielectric materials of unlike index, as in FIGS. 1A and 1B.

It is also possible in the embodiment of FIG. 3 to readily provide more than just a variation in thin-film thickness in order to provide the guiding, that is, the composition of the guiding structure may depend on radial position. This latter effect could be achieved in the embodiment of FIG. 3 by providing a variable thickness alloyed region 33 (not shown), the index of refraction of which is significantly different from that of the substrate layer 32. Such a difference in index could be achieved illustratively by providing a relatively heavy element in heavy concentrations in the alloyed region 33. The use of gold or platinum dopants is suggested. The variable thickness of region 33 could be achieved by modifying the embodiment of FIG. 3 to make the junction flat.

To couple out the stimulated radiation from the embodiment of FIG. 3, it may be desirable to bring an output coupling element such as a prism very close to one portion of the edge of the junction 31 which extends to the upper surface of the device beyond electrode 35. Also, a slight asymmetry in the circular contours of varying thickness could also allow part of the stimulated radiation to leak out at a selected point on the periphery of the junction.

Apart from the types of structures illustrated in FIGS. 1A, 1B and 3, it also appears to be feasible to fabricate lasers according to my invention in which guiding is achieved by making the density of the guiding structure to depend on radial position therein. This could be done without variation in thickness or in initial composition, for example, by properly developing circularly symmetrical structures which are formed in dichromated gelatin upon exposure to a corresponding pattern of blue or ultraviolet light. It is, of course, still necessary in such a structure to provide that the material also include a gain medium that can be pumped to produce the necessary population inversion. The gain medium may be provided in the guiding layer, in a bounding medium, or in any combination of the two. At the present time, the known laser dyes and neodymium ions appear to be the best candidates for such media, except that the injection lasers of the type shown in FIG. 3 would typically use gallium arsenide.

A variety of techniques for coupling the stimulated radiation from lasers according to my invention can be used. One such technique is shown in the embodiment of FIG. 4.

Figure 2D:
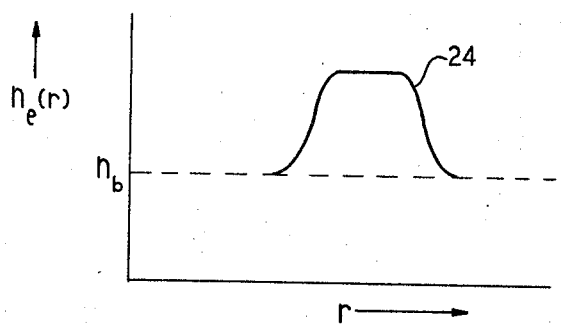
Figure 4:
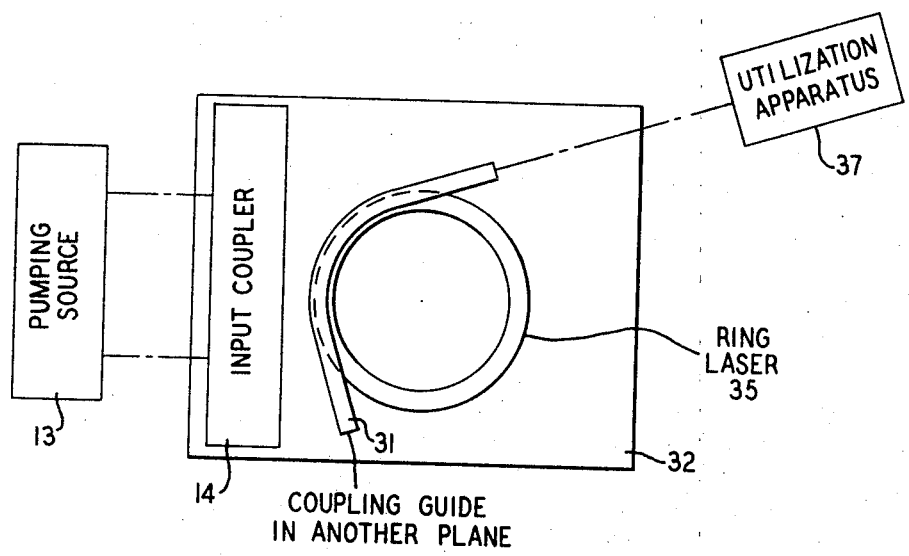
FIG. 4 shows a modification of the embodiment of FIG. 1.

The embodiment of FIG. 4 is basically a modification of the embodiment of FIG. 1 in which the output coupler 16 has been eliminated and in which the effective index profile has been changed to one more closely approximating that shown in FIG. 2D.

Output coupling is now provided by a thin film guide 31 disposed in a plane above the plane of the ring laser 35. The evanescent field of the stimulated radiation in laser structure 35 reaches the coupling guide 31; and, if the coupling is weak enough not to quench the feedback and resultant oscillations in structure 35, a portion of the stimulated emission will readily be coupled into guide 31 from which it can be delivered to the utilization apparatus 37. Such coupling does not require phase-matched propagation conditions in the two guides.

A variety of other output coupling techniques appear to be feasible. For example, a wedge-shaped region can be provided in the guiding structure. This wedge-shaped region would differ in effective refractive index from the rest of the guiding ring. One edge would be radial and would reflect light only back into the guiding ring. The other edge would be non-radial and would deflect portions of the light to both the interior and exterior portions of the guiding ring. Typically, that deflected toward the interior portion would be absorbed by suitable means so as not to re-enter the laser structure at another point. Such a wedge could be provided with either an increase or a decrease of effective refractive index relative to that of the adjacent portion of the laser structure; and the associated index change should be sharp; that is, the index change should occur within about a wavelength or so. A particular type of coupling wedge will be discussed hereinafter in connection with FIG. 7.

It would also be possible to dispose the coupling guide 31 in the plane of the ring laser structure 35 spaced at an evanescent field-coupling distance, e.g., one wavelength, particularly if it were disposed on the side of the ring laser structure 35 away from the direction of application of pump light, so that it did not interfere with the pumping process.

A still further technique for output coupling from embodiments of my invention would employ any of the several diffraction grating couplers which have been described in the recent literature. For example, the lines of the grate would typically be oriented so that they passed entirely across the positive feedback path of the laser structure at an oblique angle to that path. Here again, an absorber in the center of an annular structure is desirable. The grating can be a dielectric grating or a grating of other material; and its period must be matched to the expected wavelength of the laser radiation. Variations of the input coupling of the pump radiation are feasible.

Pump sources irradiating the plane from above are potentially significant for arrangements in which the pump light is absorbed by the laser's active material within a few wavelengths.

Figure 5:
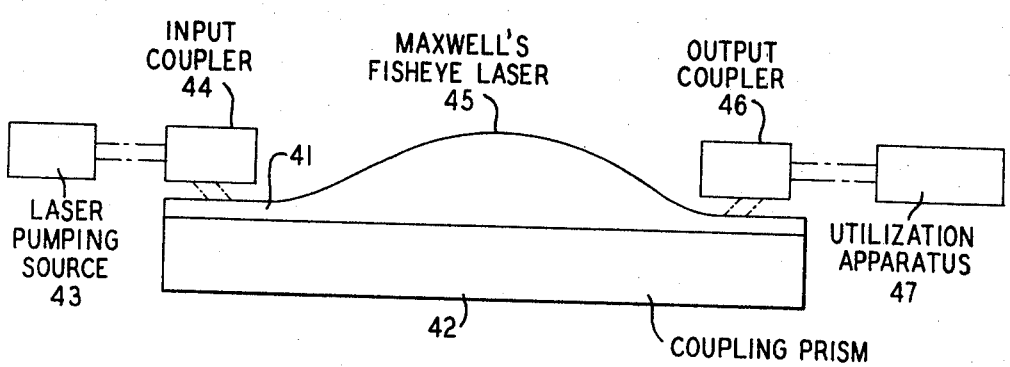
FIG. 5 is a partially pictorial and partially block diagrammatic illustration of a Maxwell fisheye embodiment of my invention.
Figure 6A:
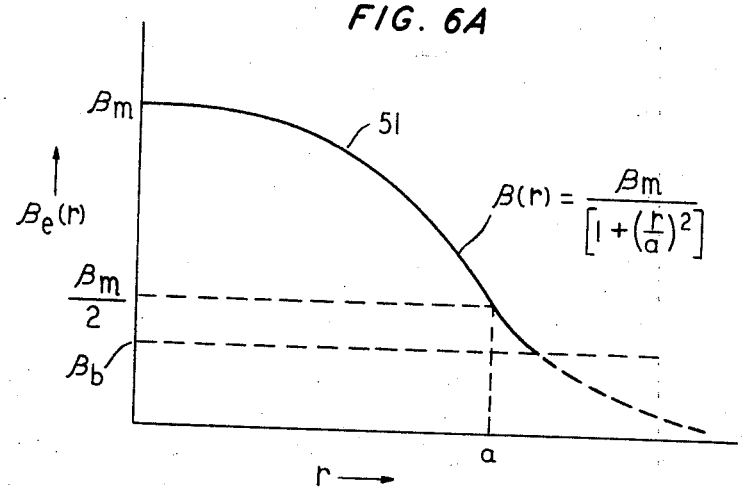
FIGS. 6 and 6A show curves useful in explaining the embodiment of FIG. 5.

One very unusual species of my invention makes use of a special profile of the effective index of refraction. An analogous three-dimensional profile was originally proposed by James Clerk Maxwell and is commonly known as Maxwell's fisheye. This special embodiment of my invention is shown in FIG. 5. The embodiment of FIG. 5 includes the substrate 42 and the guiding thin film 41 in which the laser feedback structure 45 is formed, as described hereinafter, with the output coupler 46 disposed in proximity thereto. The pumping radiation from the source is coupled into thin film 41 through an input coupler 44 from a laser source 43, all of which are similar to the corresponding components of the embodiment of FIGS. 1A and 1B. The embodiment of FIG. 5 differs from that of FIG. 1 in that a special case of the generalized index profile of FIG. 2B is employed. This specific index profile is shown in curve 51 of FIG. 6A. The phase propagation constant $\beta$, in the same units as the effective index of refraction discussed hereinbefore, varies from a maximum value $\beta_m$ at a value of the radius $r = o$ to the surrounding value $\beta_b$ of the guiding thin film 41, beyond which point the profile can be tapered into the thin film 41 even though the "fisheye" profile would continue smoothly down, as shown by the dotted line. For the purposes of my invention, it is the region of curve 51 around a value of $\beta = \frac{1}{2} \beta_m$ which is most important. The value of radius at this value of $\beta$ is equal to $a$. The shape of curve 51 satisfies the relationship:

$$\beta(r) = \beta_m/[1+(r/a)^2]. \tag{4}$$

In operation, as Maxwell showed for a spherical body of radially varying index of refraction, all the ray paths are circles. As a consequence of this fact, a point outside the circle $r = a$ is matched to a point inside the circle determined by inversion through the origin, where the product of the respective distances from the origin (center of the structure) is equal to $a^2$. Moreover, all the ray paths connecting any pair of points have the same optical pathlength. In the essentially two-dimensional thin film embodiment of FIG. 5, such a profile of effective index or phase propagation constant implies a highly degenerate optical resonator in the neighborhood of $r = a$. Thus, it appears that the embodiment of FIG. 5 is a ring-type thin film analog of the confocal Fabry-Perot resonator.

Figure 6B:
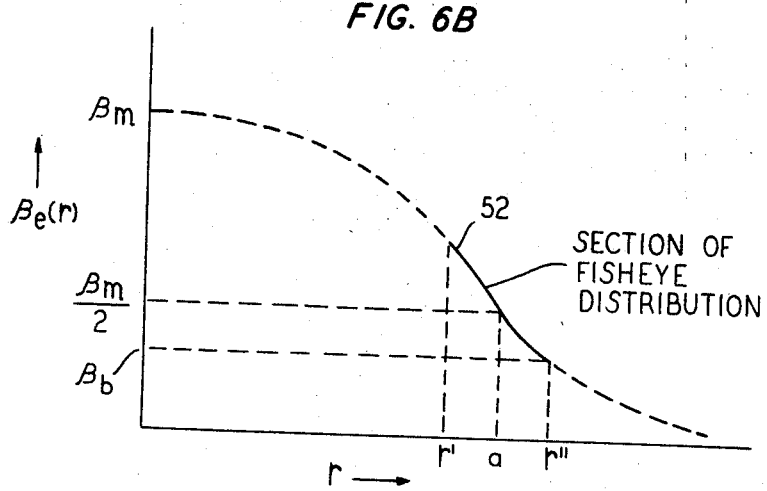

It is important to reproduce the fisheye profile in the neighborhood of $r = a$, since this circle must be crossed by any closed ray path within the structure. Because of the physical limitations on varying the magnitude of the actual index of refraction or the phase propagation constant by varying film thickness, it appears desirable to reproduce the fisheye profile only in a region between $r'$ and $r''$, which are values of $r$ equally below and above $a$, respectively, as shown in FIG. 6B by curve 52. Typically, the value of $r''$ would be chosen so that the corresponding value of $\beta$ matches that of the surrounding thin film 41.

In addition to the foregoing embodiments of my invention, there is a family of topologically open structures, including planar spirals and helices, which become ring-like positive feedback structures according to my invention when neighboring portions are close enough to permit close cross-coupling of the stimulated radiation therebetween. Such embodiments are shown in FIGS. 7 and 8.

Figure 7:
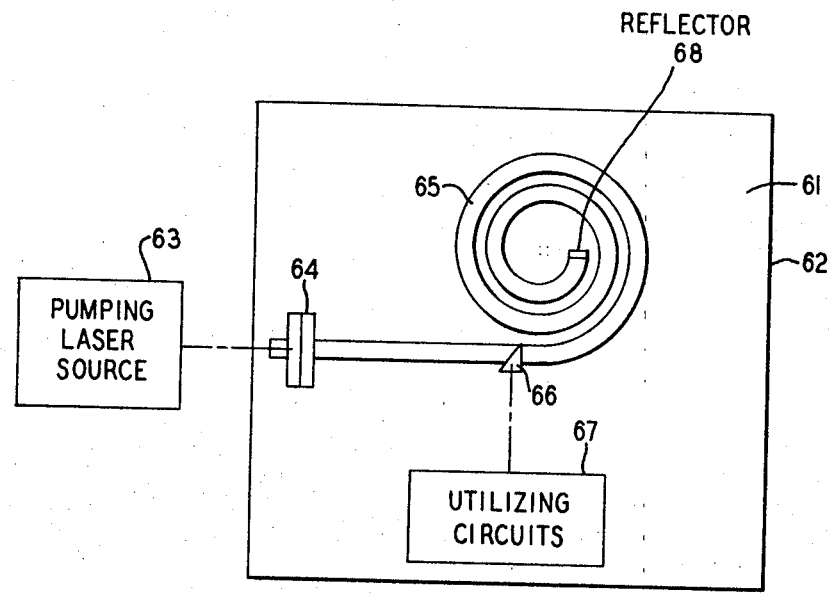
FIGS. 7 and 8 respectively show spiral and helical modifications of the embodiment of FIG. 1.

In the embodiment of FIG. 7, the laser feedback structure 65 is illustratively a spiral region of increased thickness in a guiding thin film 61 which is disposed on a substrate 62 as shown. The structure 65 illustratively includes an active medium such as $Nd^{3+}$ ions. While it could be pumped by a broad optical beam guided in thin film 61, an alternative is to extend the outer end of the spiral region beyond coupling distance to any adjacent turn and couple a narrow pump beam from source 63 directly into structure 65 for guiding therein. Advantageously, it is nearly totally absorbed in structure 65; and it passes through coupling means 66 without significant reflection.

The inner end of structure 65 is provided with a reflector 68 to direct the stimulated radiation back toward the dichroic prism that serves as the output coupling means 66 from which at least a portion is reflected toward the utilizing circuits 67. Circuits 67 are illustratively integrated into the same thin film 61 as structure 65.

Figure 8:
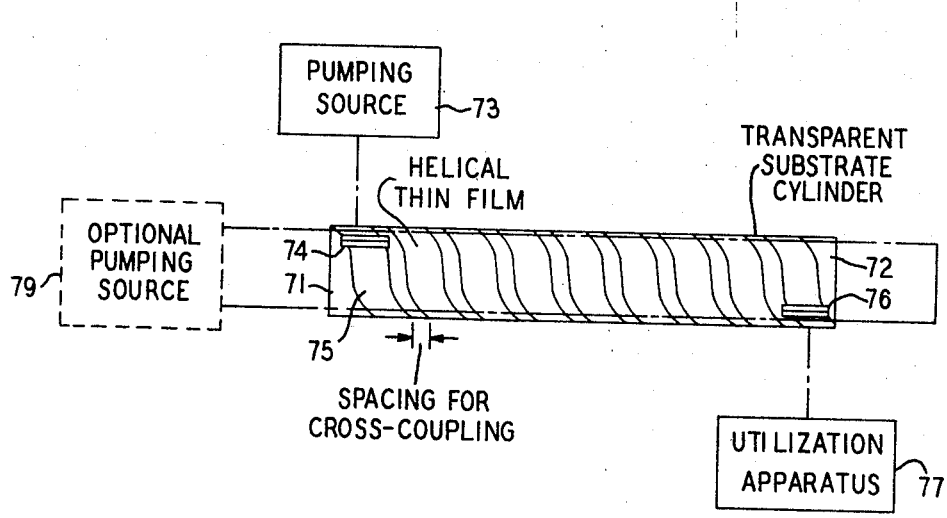
Figure 9A:
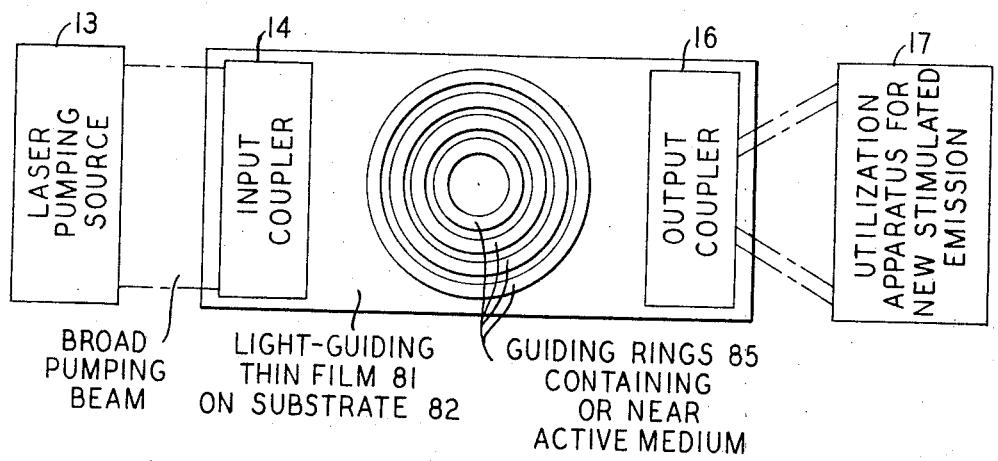
FIGS. 9A and 9B show plan and elevation views, respectively of another modification of the embodiment of FIG. 1 using closely coupled rings.
Figure 9B:
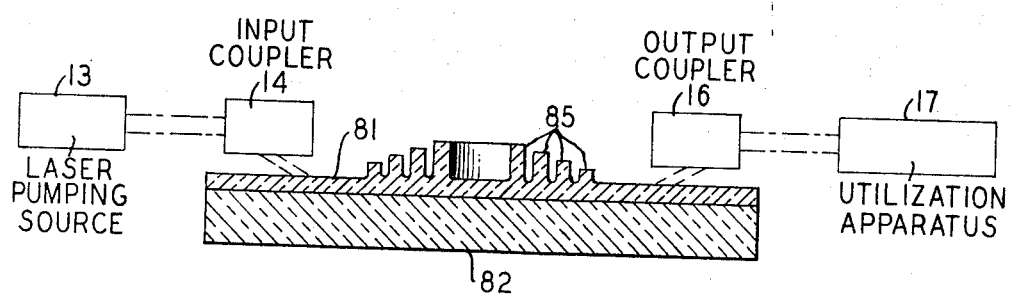

The spacing between adjacent turns of spiral structure 65, like the spacings between adjacent turns of structures 75 and 85 in FIGS. 8, 9A and 9B, is chosen to be of the order of one wavelength of the stimulated radiation and to provide such close coupling of the turns, so that substantial interchange of radiation occurs between the turns by evanescent field coupling. The coupling occurs to both sides of a typical turn continuously in space.

In the spiral structure 65 of FIG. 7, this close coupling provides positive feedback because it provides the equivalent of many ring-like structures for different portions of the stimulated radiation. Oscillation is thereby obtainable.

The flat spiral structure 65 of FIG. 7, as well as the multiple-ring structure 85 of FIGS. 9A and 9B, would benefit from an appropriate decrease of phase propagation constant $\beta$ as $r$ increases along the spiral to permit matching of the phases of propagating waves in adjacent turns of differing radii. It appears that a preferred match could be provided for a selected mode or modes of oscillation.

In contrast, in the helical embodiment of FIG. 8, adjacent turns of the helical guiding structure 75 in thin film 71 have the same radii because they are wound on substrate cylinder 72. Therefore, they do not require relative index profiling from one turn to the next. This laser configuration could also be pumped by a flash lamp, shown as optional pumping source 79, disposed on the axis of the cylinder 72.

In other respects, the embodiment of FIG. 8 is like the embodiment of FIG. 7.

The embodiment of FIGS. 9A and 9B, except for the similarity of its closely coupled multiple-ring structure 85 to the spiral structure 65 of FIG. 7, is very similar in structure and operation to the embodiment of FIG. 1.

It should be understood that in all the foregoing embodiments, an active medium could be provided adjacent to the guiding structure. For example, dye could be flowed over the guiding structure and optically pumped from above, that is, in a direction orthogonal to the plane of the thin-film guiding structure.

I claim:

1. Apparatus for the stimulated emission of coherent radiation, comprising a medium having a transition suitable for supplying said radiation, means for pumping said medium to invert the population of said transition, and means forming a continuously-curved ring-like path and having at least one dimension of the order of a wavelength of said coherent radiation for continuously guiding radiation from said transition with respect to said one dimension and with respect to the curvature of said ring-like path to provide positive feedback around said path, thereby to stimulate the emission of said coherent radiation, said guiding means comprising a body of transparent material having two major surfaces and a distance therebetween of the order of a wavelength of said radiation, said body having a circularly symmetrical region of increased phase propagation constant in which said ring-like positive feedback occurs, said region including a plurality of circularly-symmetrical portions in each of which the phase propagation constant varies from a local minimum to a local maximum and then to another local minimum for positions of increasing radial distance within said region, and means for utilizing said radiation, said utilizing means including means for coupling radiation from said guiding means.

2. Apparatus for the stimulated emission of coherent radiation, comprising a medium having a transition suitable for supplying said radiation, means for pumping said medium to invert the population of said transition, and means forming a continuously-curved ring-like path and having at least one dimension of the order of a wavelength of said coherent radiation for continuously guiding radiation from said transition with respect to said one dimension and with respect to the curvature of said ring-like path to provide positive feedback around said path, thereby to stimulate the emission of said coherent radiation, the guiding means comprising a body of transparent material having two major surfaces each having a shape that is closed about a common direction, said surfaces having a distance therebetween of the order of a wavelength of said radiation, said body having a helical region of increased phase propagation constant, said helical region having a plurality of turns between which said ring-like positive feedback occurs by evanescent field coupling, and means for utilizing said radiation, said utilizing means including means for coupling radiation from said guiding means.

* * * * *